3,442,828
FOAMED RESIN PROCESS
Friedrich J. O. Engelhardt, Frankfurt-Fechenheim, Germany, and Asaf A. Benderly, Potomac, Md., assignors to the United States of America as represented by the Secretary of the Army
No Drawing. Filed July 27, 1966, Ser. No. 568,345
Int. Cl. C08f 47/10, 33/08
U.S. Cl. 260—2.5                                                                7 Claims

ABSTRACT OF THE DISCLOSURE

A foamed-in-place styrene-base body is made by: (a) forming a rapid-curing mixture containing styrene and at least one substituted styrene monomer more reactive than styrene, up to 1 percent by weight of a free radical polymerization initiator, 1 to 10 percent by weight of a blowing agent, and up to 20 percent by weight of an insoluble, finely divided polymeric bubble-nucleator; (b) pouring the mixture into a receptacle; and (c) heating the mixture to about 70° C. to simultaneously foam and polymerize the mixture.

---

The invention described herein may be used by or for the Government of the United States for governmental purposes without the payment to us of any royalty thereon.

This invention relates to methods of making foamed styrene-base bodies and more particularly to a method of making foamed-in-place styrene bodies, such method being well suited to the protective encapsulation of electronic assemblies within such a body.

In the manufacture of electronic assemblies, it is often necessary to protect certain components thereof from the effects of adverse atmospheric conditions, moisture, corrosive fumes, vibration and other mechanical shock. It is well-known to protect such components by encapsulation with suitable resins. More recently, it has become known to protect various other articles by means of foamed-in-place resins.

Commercially available foamed-in-place resin systems, wherein polymerization and foaming take place concurrently, are generally based on polyurethanes and silicones. Such polymers are relatively expensive as compared to styrene-based resins, and from the dielectric standpoint exhibit substantially higher losses than polystyrene. A foamed-in-place system based on styrene would be expected to be more economical and to provide encapsulated articles of adequate mechanical strength exhibiting unusually low dielectric losses.

Although foamed polystyrenes are known, they are generally produced by first polymerizing styrene, and then fusing the polystyrene polymer prior to initiating the foaming reaction. The foamed polystyrenes of commerce are most conveniently produced by steam-heating expandable prepolymerized beads. Other systems involve the prepolymerization of a mass of styrene into which a blowing agent has been incorporated; this polymerization takes place over a period of many days at a temperature well below the boiling point of the blowing agent. To initiate foaming, the polymer mass is heated above its softening point and also above the boiling point of the blowing agent. The polymerization and foaming steps do not take place at the same time and the product is not a true foamed-in-place resin. Such systems are generally unsuitable for the protective encapsulation of electronic and other delicate assemblies as they may require heavy-wall molds, high temperatures to soften the polymer, and/or long curing times. Those systems which utilize steam leave at least some water within the foam to act as a source of corrosion and otherwise defeat the purposes of encapsulation.

We have discovered a novel method for making foamed-in-place styrene base resins. Our method is particularly valuable for protective encapulation of articles.

It is an object of our invention to provide a novel method for producing foamed styrene-base resins at very low cost, It is another object of the present invention to provide a new and improved method for the protective encapsulation of articles such as electronic assemblies.

It is a further object of the invention to provide a practical method for foaming styrene-based resins around the articles to be protected.

It is yet another object of the present invention to provide an economical method for the protective encapsulation of electronic assemblies with a low density material having good mechanical and superior dielectric properties.

These and other desirable objects and advantages are obtained by the method of the present invention for making a foamed-in-place styrene-base body which comprisese the steps of (a) forming a rapid-curing mixture containing styrene and one or more substituted styrene monomers more reactive than styrene, said mixture containing up to 1 percent by weight of a free radical polymerization initiator, 1 to 10 percent by weight of a blowing agent, and up to 20 percent by weight of an insoluble, finely divided, polymeric bubble-nucleator; (b) pouring the aforesaid mixture into a receptable; and (c) heating the mixture to about 70° C., thereby effecting simultaneous foaming and polymerization of the mixture.

The process of the present invention utilizes a rapid-curing styrene-based resin in order that polymerization and foaming take place simultaneously. Styrene, alone, is notoriously slow curing, often requiring many days or even longer to harden, and its polymerization cannot be effectively synchronized with the evolution time of a blowing agent. Accordingly, the current system relies on the use of a substituted styrene such as dichlorostyrene, divinylbenzene or other compatible reactive monomer to accelerate the polymerization reaction. The resin system may also contain polystyrene, a substituted polystyrene or a styrene-olefin copolymer or mixtures thereof. Such polymers act as fillers to reduce the overall shrinkage due to polymerization. The presence of the polymers may also be useful in adjusting the viscosity of the resin mixture, shortening its polymerization time, and reducing the heat of reaction.

One to 10 percent by weight of a blowing agent or propellant is employed to effect foaming as is well-known to those skilled in the art. The blowing agent may be a volatile liquid boiling below about 70° C., i.e., pentane or hexane, or a conventional solid blowing agent decomposing below about that same temperature to liberate a gas such as nitrogen or carbon dioxide.

Up to 20 percent by weight of an insoluble, finely divided, polymeric bubble-nucleator may be added to the resin mixture to control bubble size and bubble distribution in the resultant foam. Such nucleators may be made of polyethylene, polypropylene, polytetrafluoroethylene, et cetera.

Polymerization is initiated by means of a free radical-producing catalyst. Preferred polymerization catalysts are organic peroxides such as benzoyl peroxide, cumene hydroperoxide, butyl hydroperoxide, and methyl ketone peroxide. The catalyst is intimately mixed with and dissolved in the polymerizable composition just prior to use.

When an article is to be encapsulated in accordance with our method, the article is placed in a mold having a shape approximating that of the desired encapsulated product and in a predetermined spaced relationship to its walls, prior to preparing the encapsulating composition. The resinous mixture is added to the mold and caused to flow about the article, dried if necessary, to be encapsulated. The mold and its contents are then heated to about 70° C. to effect polymerization and foaming. Complete curing is usually obtained within 30–45 minutes.

Electronic assemblies which may be encapsulated according to the method of the present invention include transistors, diodes, transformers, resistors, capacitors, inductors, vacuum tubes, et cetera. Such assemblies would be used in proximity fuzes, radio equipment, hearing aids, radar sets, electronic control devices, et cetera. The expression "electronic assemblies" as used herein is intended to include individual components, components electrically connected, parts of an electrical circuit including one or more components, as well as complete electric circuits, including integrated and thin-film circuits.

An important requirement of an encapsulating method or material for electronic assemblies is that the encapsulating material used must harden to a solid without adversely affecting the operation of the circuit components or the circuits in which the components are employed. The material employed must have characteristics which will allow it to be poured or caused to flow and completely surround and envelop the article being encapsulated without leaving any voids. It should cure in a short period at relatively low temperatures without undergoing any appreciable degree of shrinkage. The encapsulated article should exhibit high impact strength, dimensional and electric stability, low dielectric losses, and a low affinity for moisture.

A particular styrene-based resinous mixture designed to meet the above requirements and more particularly to provide a low dielectric loss foam consists of, by weight:

| | Percent |
|---|---|
| NBS casting resin (styrene, polystyrene, dichlorostyrene, polydichlorostyrene) | 89.5 |
| Methyl ethyl ketone peroxide (polymerization initiator) | 0.5 |
| Hexane (foaming agent) | 5.0 |
| Polyethylene powder (nucleating agent) | 5.0 |

Another system designed to provide such a low dielectric loss encapsulating foam consists of, by weight:

| | Percent |
|---|---|
| Styrene | 21.7 |
| Polystyrene | 11.4 |
| 2,5-dichlorostyrene | 23.0 |
| Poly-2,5-dichlorostyrene | 22.2 |
| Divinylbenzene | 0.2 |
| Methyl ethyl ketone peroxide (polymerization initiator) | 0.5 |
| Hexane (blowing agent) | 5.0 |
| Polyethylene powder (nucleating agent) | 5.0 |

Rigid foams with densities between 12–53 lbs./cu. ft. with dielectric constants ranging from 1.2–1.8 and dissipation factors from 1.0002–0.001 have been obtained by this method. Compressive strengths are comparable to those of polyurethane foams of the same densities. The range of densities can be extended and flexible foams can also be prepared by suitable modification of the basic formulations.

For some purposes, instead of letting the resin foam and harden around the article to be protected, it will be more satisfactory to let the resin foam and harden in a mold or vessel or similar temporary receptacle, to obtain foamed bodies, which may be in the form of blocks, slabs, bars, shells, or other configurations, which bodies may then be placed around or in proximity to the article to be protected.

It is evident that further changes and modifications may be made in the process described above without departing from the spirit and the scope of the present inventions. The invention is as described in the appended claims.

We claim:

1. A method of making a foamed-in-place styrene base body which comprises the steps of (a) forming a rapid curing mixture containing styrene and at least one substituted styrene monomer[s] more reactive to polymerization than styrene, said mixture containing up to 1 percent by weight of a free radical polymerization initiator, 1 to 10 percent by weight of a blowing agent, and up to 20 percent by weight of an insoluble, finely divided, polyolefin as a bubble-nucleator; (b) pouring the aforesaid mixture into a receptacle; and (c) heating the mixture to about 70° C., thereby effecting simultaneous foaming and polymerization of the mixture.

2. A method according to claim 1 wherein the rapid-curing mixture consists of:

| | Percent |
|---|---|
| A casting resin containing styrene, polystyrene, dichlorostyrene | 89.5 |
| Methyl ethyl ketone peroxide | 0.5 |
| Hexane | 5.0 |
| Polyethylene powder | 5.0 |

3. A method according to claim 1 wherein the rapid-curing mixture consists of:

| | Percent |
|---|---|
| Styrene | 21.7 |
| Polystyrene | 11.4 |
| 2,5-dichlorostyrene | 34.0 |
| Poly-2,5-dichlorostyrene | 22.2 |
| Divinylbenzene | 0.2 |
| Methyl ethyl ketone peroxide | 0.5 |
| Hexane | 5.0 |
| Polyethylene powder | 5.0 |

4. A method according to claim 1 comprising the additional step of positioning an article within said receptacle prior to pouring the mixture into the receptacle, so that the article becomes protectively encapsulated in said body.

5. A method according to claim 4 wherein the article is an electronic assembly.

6. A method according to claim 5 wherein the rapid-curing mixture consists of:

| | Percent |
|---|---|
| A casting resin constaining styrene, polystyrene, dichlorostyrene | 89.5 |
| Methyl ethyl ketone peroxide | 0.5 |
| Hexane | 5.0 |
| Polyethylene powder | 5.0 |

7. A method according to claim 5 wherein the rapid-curing mixture consists of:

| | Percent |
|---|---|
| Styrene | 21.7 |
| Polystyrene | 11.4 |
| 2,5-dichlorostyrene | 34.05 |
| Poly-2,5-dichlorostyrene | 22.2 |
| Divinylbenzene | 0.2 |
| Methyl ethyl ketone peroxide | 0.5 |
| Hexane | 5.0 |
| Polyethylene powder | 5.0 |

(References on following page)

References Cited

UNITED STATES PATENTS

| | | |
|---|---|---|
| 3,027,336 | 3/1962 | Gotz et al. |
| 3,224,984 | 12/1965 | Roper et al. |
| 3,285,865 | 11/1966 | Del Bene et al. |
| 3,287,286 | 11/1966 | Ohlinger et al. |
| 3,232,892 | 2/1966 | Fisher. |

OTHER REFERENCES

Franklin et al., "Plastics," vol. 6–7, 1947, pp. 57–59 and 71.

SAMUEL H. BLECH, *Primary Examiner.*
MORTON FOELAK, *Assistant Examiner.*

U.S. Cl. X.R.

260—878, 884, 886; 264—45, 53, 236, 272, 299